United States Patent
Stoller et al.

(10) Patent No.: US 9,873,337 B2
(45) Date of Patent: Jan. 23, 2018

(54) METHOD AND SYSTEM FOR STARTING A MOTOR VEHICLE

(71) Applicant: Robert Bosch GmbH, Stuttgart (DE)

(72) Inventors: Felix Stoller, Stuttgart (DE); Albert Geiger, Eberdingen (DE); Oliver Keil, Winterstein (DE); Amalinda Christina Post, Ludwigsburg (DE); Eberhard Schoch, Stuttgart-Feuerbach (DE); Turgut Karacay, Weil der Stadt (DE); Juergen Motz, Steinheim an der Murr (DE); Stefan Raeumschuessel, Ditzingen (DE); Stefan Harport, Mainhardt (DE); Sebastian Walenta, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 476 days.

(21) Appl. No.: 14/409,694

(22) PCT Filed: Apr. 25, 2013

(86) PCT No.: PCT/EP2013/058587
§ 371 (c)(1),
(2) Date: Dec. 19, 2014

(87) PCT Pub. No.: WO2013/189643
PCT Pub. Date: Dec. 27, 2013

(65) Prior Publication Data
US 2015/0336460 A1    Nov. 26, 2015

(30) Foreign Application Priority Data

Jun. 22, 2012 (DE) .......................... 10 2012 210 605

(51) Int. Cl.
*B60L 1/00* (2006.01)
*B60L 11/18* (2006.01)
(Continued)

(52) U.S. Cl.
CPC ............... *B60L 11/18* (2013.01); *B60L 11/02* (2013.01); *B60L 11/1868* (2013.01);
(Continued)

(58) Field of Classification Search
USPC ...................................................... 307/10.1
See application file for complete search history.

(56) References Cited

U.S. PATENT DOCUMENTS

2007/0113814 A1    5/2007    Tamai et al.

FOREIGN PATENT DOCUMENTS

CN    101420137 A    4/2009
DE    197 05 634    8/1998
(Continued)

OTHER PUBLICATIONS

International Search Report for PCT/EP2013/058587, dated Dec. 2, 2013.

*Primary Examiner* — Rexford Barnie
*Assistant Examiner* — Dru Parries
(74) *Attorney, Agent, or Firm* — Norton Rose Fulbright US LLP; Gerard Messina (57) ABSTRACT

In a method for starting a motor vehicle having a first vehicle electrical system, to which a battery of the motor vehicle is assigned, a second vehicle electrical system, to which an electric machine of the motor vehicle is assigned, and a DC/DC converter for connecting the two vehicle electrical systems, for starting, electrical energy from the second vehicle electrical system is converted via the DC/DC converter and transferred into the first vehicle electrical system if an actual value of at least one operating parameter of the
(Continued)

battery falls below a setpoint value prior to a starting operation to be carried out.

14 Claims, 5 Drawing Sheets

(51) Int. Cl.
   *B60L 11/02* (2006.01)
   *F02N 11/08* (2006.01)
   *H02J 7/00* (2006.01)
   *H02J 7/14* (2006.01)

(52) U.S. Cl.
   CPC ........ *F02N 11/0866* (2013.01); *H02J 7/0054* (2013.01); *H02J 7/1423* (2013.01); *F02N 2011/0888* (2013.01); *Y02T 10/7005* (2013.01); *Y02T 10/7066* (2013.01)

(56) References Cited

FOREIGN PATENT DOCUMENTS

| | | |
|---|---|---|
| DE | 10 2010 004620 | 8/2011 |
| EP | 1 130 737 | 9/2001 |
| WO | WO 2011/012428 | 2/2011 |

METHOD AND SYSTEM FOR STARTING A MOTOR VEHICLE

BACKGROUND OF THE INVENTION

1. Field of the Invention

The present invention relates to a method and a system for starting a motor vehicle.

2. Description of the Related Art

Conventional motor vehicles having only one internal combustion engine as the drive include a single vehicle electrical system having a nominal voltage. However, hybrid vehicles also have an electric motor in addition to the internal combustion engine, two vehicle electrical systems, namely a so-called high-volt vehicle electrical system having a high voltage level and a low-voltage vehicle electrical system having a lower voltage level. A DC/DC converter situated between the two aforementioned vehicle electrical systems may convert and thus transfer energy between the two vehicle electrical systems on demand.

The international patent application publication WO 2011/012428 A2 describes a circuit system for a vehicle electrical system having a basic vehicle electrical system including an energy store, a power vehicle electrical system, including an additional energy store and a DC/DC converter, the DC/DC converter being provided for coupling between the basic vehicle electrical system and the power vehicle electrical system.

BRIEF SUMMARY OF THE INVENTION

Against this background, a method and a system having the features of the independent patent claims are presented. Additional embodiments of the present invention are derived from the dependent patent claims and the description.

For example, an emergency start of a motor vehicle having a hybrid system, which includes as the first drive unit an internal combustion engine and as the second drive unit an electric machine, in the form of either an electric motor or a generator, is possible using this method and this system.

Such a motor vehicle having a hybridized drive includes a first vehicle electrical system having a first nominal voltage and a second vehicle electrical system having a second nominal voltage, the first nominal voltage, i.e., the first rated voltage of the first vehicle electrical system (low-voltage vehicle electrical system) being lower than the second nominal voltage and thus the second rated voltage of the second vehicle electrical system (high-voltage vehicle electrical system). A first battery having the low nominal voltage, a starter designed for starting the internal combustion engine and additional consumers are assigned to the first vehicle electrical system as the energy store. The electric machine, a second battery having the high nominal voltage as the energy store and additional consumers, if necessary, are assigned to the second vehicle electrical system. Alternatively, it is possible for the starter to be assigned to the second vehicle electrical system instead of to the first vehicle electrical system.

This method takes into account the fact that the battery in the first vehicle electrical system having the low nominal voltage discharges, in the event of an excessively long idle time, to such an extent that the battery cannot provide enough energy for operating the starter, so that a start is no longer possible.

By carrying out the method, the starting capability may be maintained even after longer idle times to which end during a starting operation to be carried out, electrical energy which is stored in the second battery, for example, is converted with the aid of the DC/DC converter and transferred from the second vehicle electrical system having a high nominal voltage into the first vehicle electrical system having a low nominal voltage. This measure makes it possible to start the motor vehicle, even when this is no longer possible using the battery in the first vehicle electrical system. Thus, even after idle times of several weeks, a starting capability may be ensured.

The method may be used, for example, in a so-called cold start or emergency start situations. When the method is carried out, starting is supported with the aid of the DC/DC converter by transferring electrical energy out of the second vehicle electrical system having a high voltage into the first vehicle electrical system having a low voltage. In doing so, the starting capability is ensured in that due to the support, with the aid of the DC/DC converter for the starting operation to be carried out, an actual value for the voltage is provided, which is greater than a setpoint value and is thus a minimum threshold. In the embodiment, the DC/DC converter may provide an actual value of 12 V, for example. In this case the voltage in the first vehicle electrical system does not drop below 6 V even in a voltage dip. The minimum threshold is determined by the starter. In addition, by checking an operating parameter, e.g., the charge, of the battery, it is possible to decide whether starting support by the DC/DC converter is necessary.

It is usually provided that a starting operation for starting the motor vehicle is signaled by the driver of the vehicle, for example, by operating an ignition key as an intent-to-start transducer is initiated. As soon as there is an intent-to-start, a control unit, for example, may check on whether at least one operating parameter of the battery from the first vehicle electrical system, with which the starter is to be supplied with electrical energy for starting the internal combustion engine, has an actual value which is at least as large as a threshold value. If the at least one operating parameter, usually the voltage, of the battery of the first vehicle electrical system, drops below the setpoint value provided for this purpose, the starting operation to be carried out is first supported by the transfer of electrical energy from the second vehicle electrical system to the first vehicle electrical system with the aid of the DC/DC converter.

It is possible here that the DC/DC converter converts and thus transmits or transfers energy from the second vehicle electrical system having the high nominal voltage to the first vehicle electrical system having the low nominal voltage after the intent-to-start but prior to the actual starting operation to be carried out during a generally short period of time of a few seconds to at most a few minutes.

Due to this initial measure, an increased acid formation is facilitated on plates of a first battery of the first vehicle electrical system designed as a lead battery, for example, thereby reducing at least briefly an internal resistance of the battery.

Alternatively or additionally, it is also possible to transfer energy from the second vehicle electrical system into the first vehicle electrical system with the aid of the DC/DC converter, even during the starting operation to be carried out.

Due to this second measure, definitely less current must be withdrawn from the battery in the first vehicle electrical system than would otherwise be usual during the starting operation since at least some of the current required for carrying out the starting operation may be supplied via the DC/DC converter from the second vehicle electrical system and thus withdrawn from same.

Due to these two measures, it is possible to reduce a voltage dip in the first vehicle electrical system which occurs during the starting operation.

The system according to the present invention is designed to carry out all steps of the method presented. Individual steps of this method may also be carried out by individual components of the system. Furthermore, functions of the system or functions of individual components of the system may also be implemented as steps of the method. Furthermore, it is possible for steps of the method to be implemented as functions of at least one component of the system or of the entire system.

Additional advantages and embodiments of the present invention are derived from the description and the accompanying drawings.

It is understood that the features defined above and yet to be explained below may be used not only in the stated combination but also in other combinations or alone without departing from the scope of the present invention.

DETAILED DESCRIPTION OF THE INVENTION

The present invention is schematically illustrated in the drawings on the basis of specific embodiments and is described in greater detail below with reference to the drawings.

The figures are described cohesively and comprehensively; the same reference numerals denote the same components.

Figure 1:
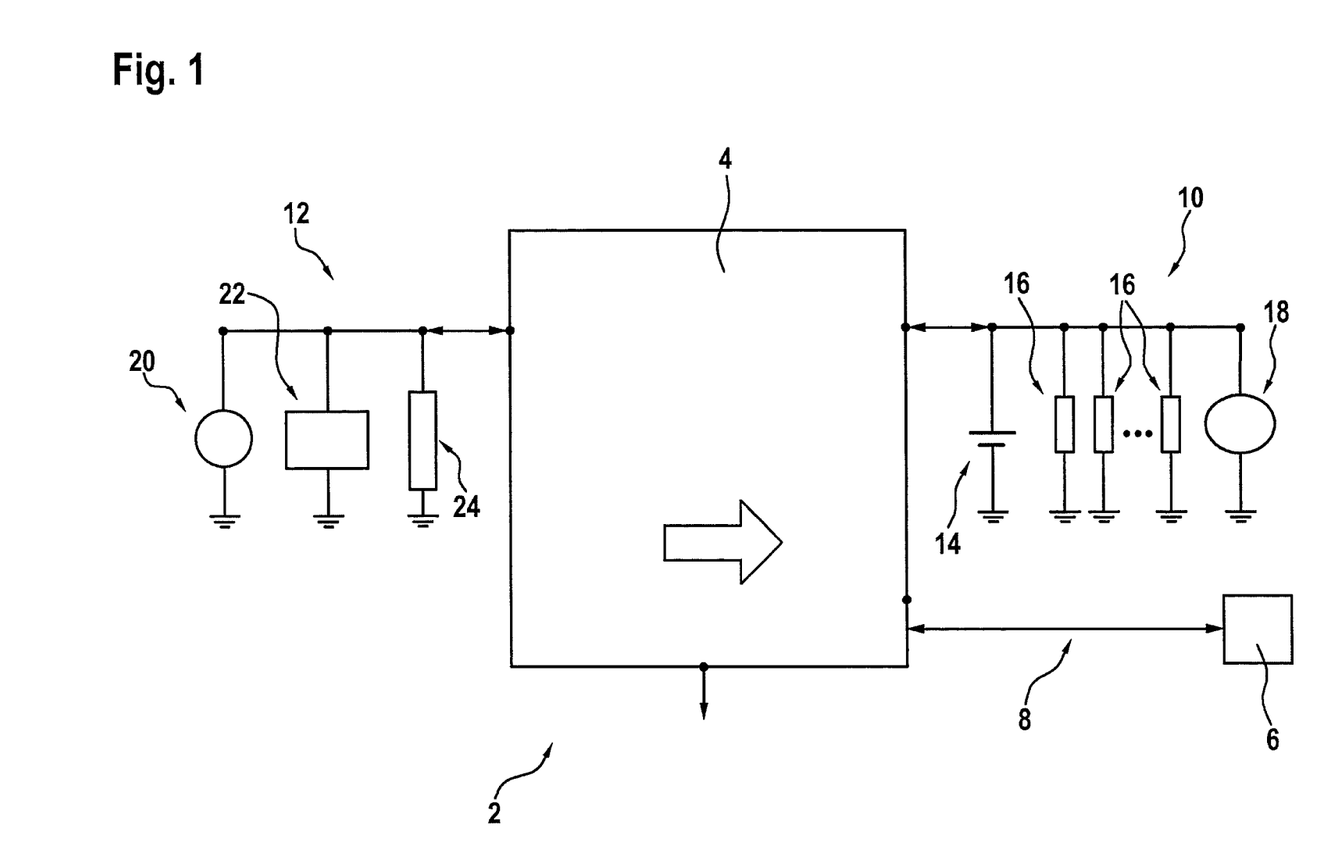
FIG. 1 shows a schematic diagram of one specific embodiment of a system according to the present invention.

FIG. 1 shows a schematic diagram of one specific embodiment of a system 2 according to the present invention for a motor vehicle, which includes a DC/DC converter 4 and a control unit 6, which is designed for monitoring and thus for controlling and/or regulating at least one step of a method according to the present invention. It is provided here that DC/DC converter 4 and control unit 6 may exchange signals via a bus network 8 designed as a CAN communications network. Bus network 8 may also be designed as a LAN, LIN or other communications network, for example, as a FlexRay bus.

This hybrid system includes a first vehicle electrical system 10, which may also be referred to as a low-voltage vehicle electrical system, and a first value for a nominal voltage in the range of approximately 6 V to 16 V, for example. Furthermore, this hybrid system includes a second vehicle electrical system 12, which may also be referred to as a high-voltage vehicle electrical system, and has a second value for a nominal voltage, which is higher than the first value of the nominal voltage of first vehicle electrical system 10. The second value of the nominal voltage of second vehicle electrical system 12 is between approximately 12 V and 400 V, for example.

A first battery 14, for example, a lead battery, which may also be referred to as a low-voltage battery, having a low nominal value for a voltage, is assigned to first vehicle electrical system 10. Furthermore, the first vehicle electrical system includes at least one consumer 16, which is designed as a low-voltage consumer and a starter 18, with which a first drive unit of the motor vehicle, which is designed as an internal combustion engine, is to be started to carry out a starting operation.

Second vehicle electrical system 12 includes an electric machine 20 as the second drive unit of the motor vehicle, which is operated either as a motor or as a generator, depending on the operating situation of the motor vehicle when carrying out a hybrid operation. In addition, second vehicle electrical system 12 includes a second battery 22, which is a lithium-ion battery, for example, which is designed as a high-voltage battery and has a nominal voltage value, which is higher than the nominal voltage value of first battery 14 in first vehicle electrical system 10. Second battery 22 is charged with electrical energy by electric machine 20 when the latter is being operated as a generator. Furthermore, second vehicle electrical system 12 may include at least one consumer 24 which is designed as a high-voltage consumer.

To carry out continuous operation of the motor vehicle, in which at least one of the aforementioned drive units, i.e., the internal combustion engine and/or electric machine 20, is operated, energy may be converted with the aid of DC/DC converter 4 as needed and thus exchanged between two vehicle electrical systems 10, 12. Furthermore, electric machine 20 and starter 18 are each connected to ground.

One specific embodiment of the method according to the present invention for starting a motor vehicle may be implemented using system 2, this motor vehicle having first vehicle electrical system 10, to which are assigned starter 18 and first battery 14, having second vehicle electrical system 12, to which electric machine 20 is assigned and having DC/DC converter 4 for connecting two vehicle electrical systems 10, 12. For starting, electrical energy from second vehicle electrical system 12 is converted via DC/DC converter 4 and transferred into first vehicle electrical system 10 if an actual value of at least one operating parameter, for example, the voltage, of first battery 14, drops below a setpoint value prior to a starting operation to be carried out.

In the embodiment, the actual value of the at least one operating parameter of first battery 14 is checked at least once by control unit 6 via a sensor when there is an intent-to-start to initiate and/or carry out the starting operation. It is possible here with the aid of a battery sensor, for example, to determine an actual value of the at least one operating parameter, for example, the instantaneous charge or voltage. At least one actual value of the operating parameter thereby ascertained, i.e., the charge and/or voltage, may be compared with the setpoint value provided. If the actual value of the charge and/or voltage of first battery 14 is at least as great as the setpoint value, then the starting capability of first battery 14 is ensured. Alternatively, the check on the actual value may also be carried out directly in DC/DC converter 4.

To be able to carry out the method, it may be provided, if necessary, for DC/DC converter 4 to also be supplied with energy from second vehicle electrical system 12 instead of just from first vehicle electrical system 10.

DC/DC converter 4 has a signal input via which DC/DC converter 4 is connected via bus network 8 to control unit 6, which supplies DC/DC converter 4 with a signal causing DC/DC converter 4 to convert electrical energy from second vehicle electrical system 12 and transfer it into first vehicle electrical system 10 after the intent-to-start.

Control unit 6 is designed to check the actual value of the at least one operating parameter of first battery 14 as soon as there is an intent-to-start. At this juncture, the starting capability of first battery 14 is checked. Control unit 6 may also be designed to monitor a function of DC/DC converter 4.

At least one of the specific embodiments of the method according to the present invention, as described with reference to the diagrams from the following FIGS. 2 and 3, may be carried out using the specific embodiment of system 2 according to the present invention described above.

Figure 2A:
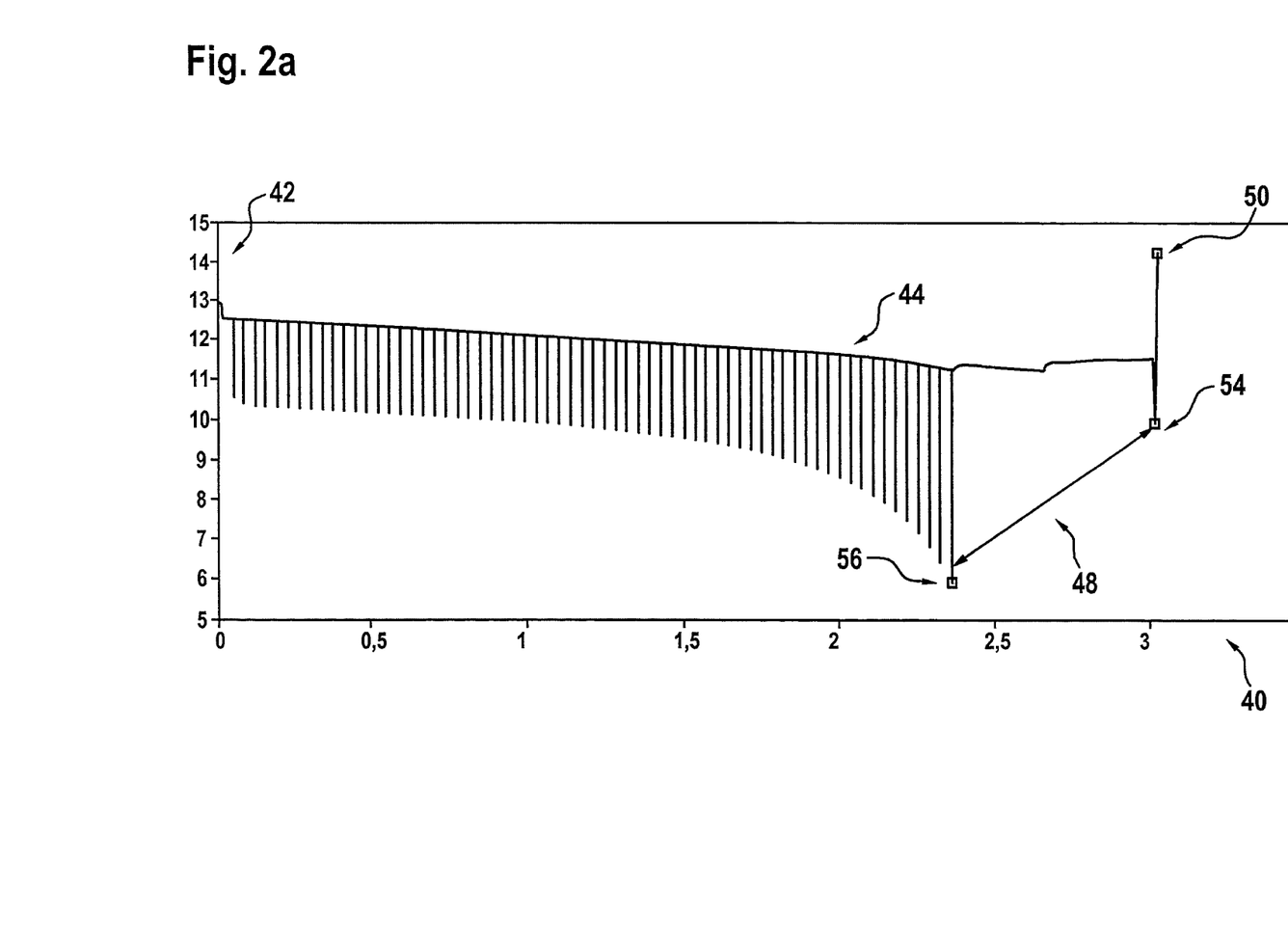
FIG. 2 shows diagrams of an operating parameter which results in a first specific embodiment of the method according to the present invention.
Figure 2B:
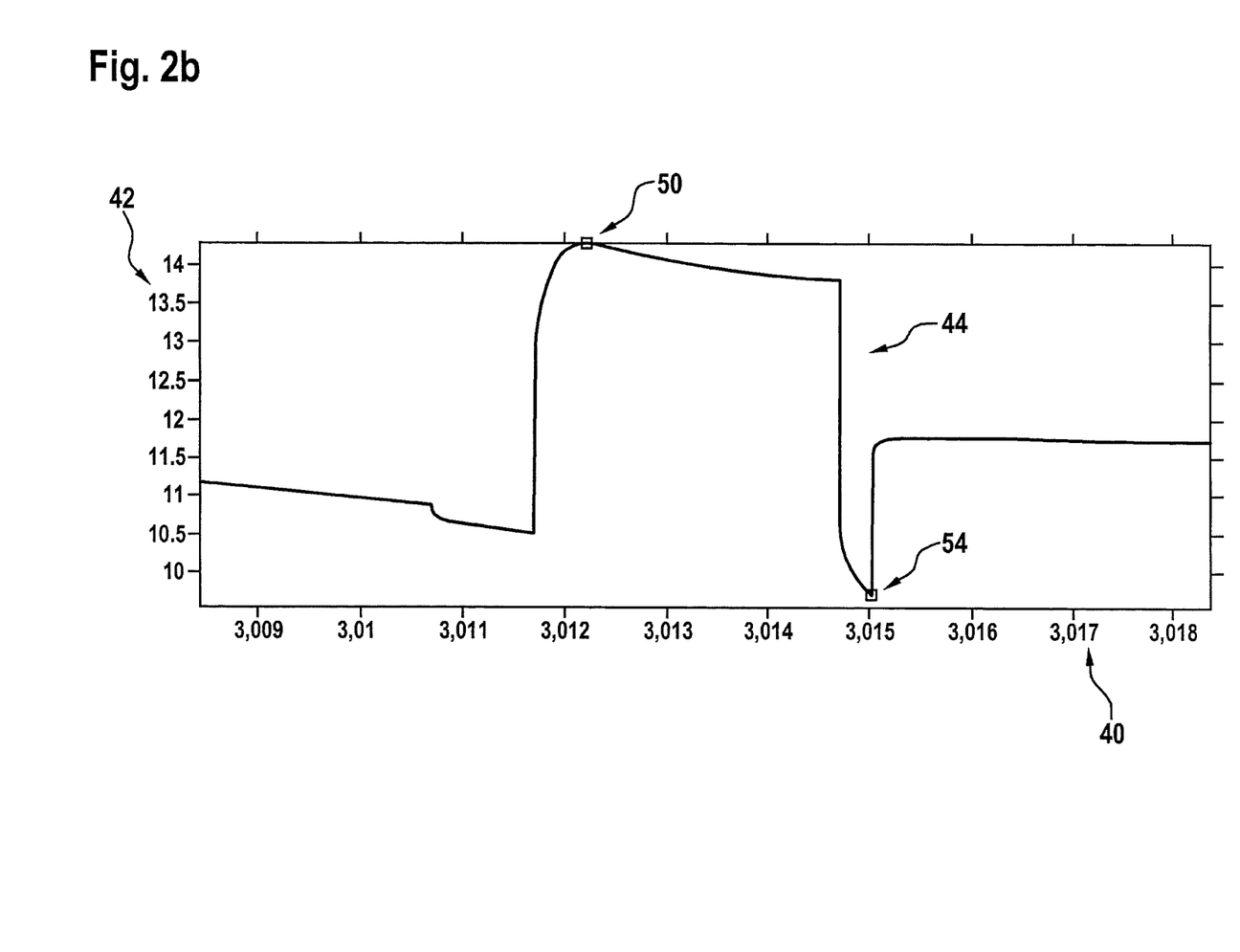

Each of the two diagrams from FIGS. 2a and 2b include an abscissa 40 along which a time is plotted in $10^4$ s. An ordinate 42 along which a voltage value of first battery 14 of first vehicle electrical system 10 is plotted, is plotted over the abscissa. In addition, the diagram in FIG. 2b shows an enlarged detail of the diagram from FIG. 2a and the diagram from FIG. 3b shows an enlarged detail of the diagram from FIG. 3a.

The diagram in FIG. 2a shows a first possible curve 44 of an actual value of the voltage over an extended period of time. FIG. 2b shows a detail of this curve 44 when the starting operation is supported by DC/DC converter 4.

The first part of the diagram in FIG. 2a shows multiple starting operations, i.e., 66 here, without support by DC/DC converter 4 in the time segment from 0 to approximately 2.4 $10^4$ s. With these starting operations, battery 14 is discharged to the extent that a starting operation from battery 14 alone is no longer possible. In the next time segment, battery 14 is discharged further to simulate a longer idle time. The battery is left at rest in the time segment from approximately 2.6 to 3.1 $10^4$ s. Only the next time segment, which is shown on an enlarged scale in the diagram in FIG. 2b, shows a start with support by DC/DC converter 4. As shown by the diagram in FIG. 2a, the starting capability is made possible only through support by DC/DC converter 4. Voltage dip 54 in the starting case with support by DC/DC converter 4 is much smaller than voltage dip 56 in the starting case without support by DC/DC converter 4.

Figure 3A:
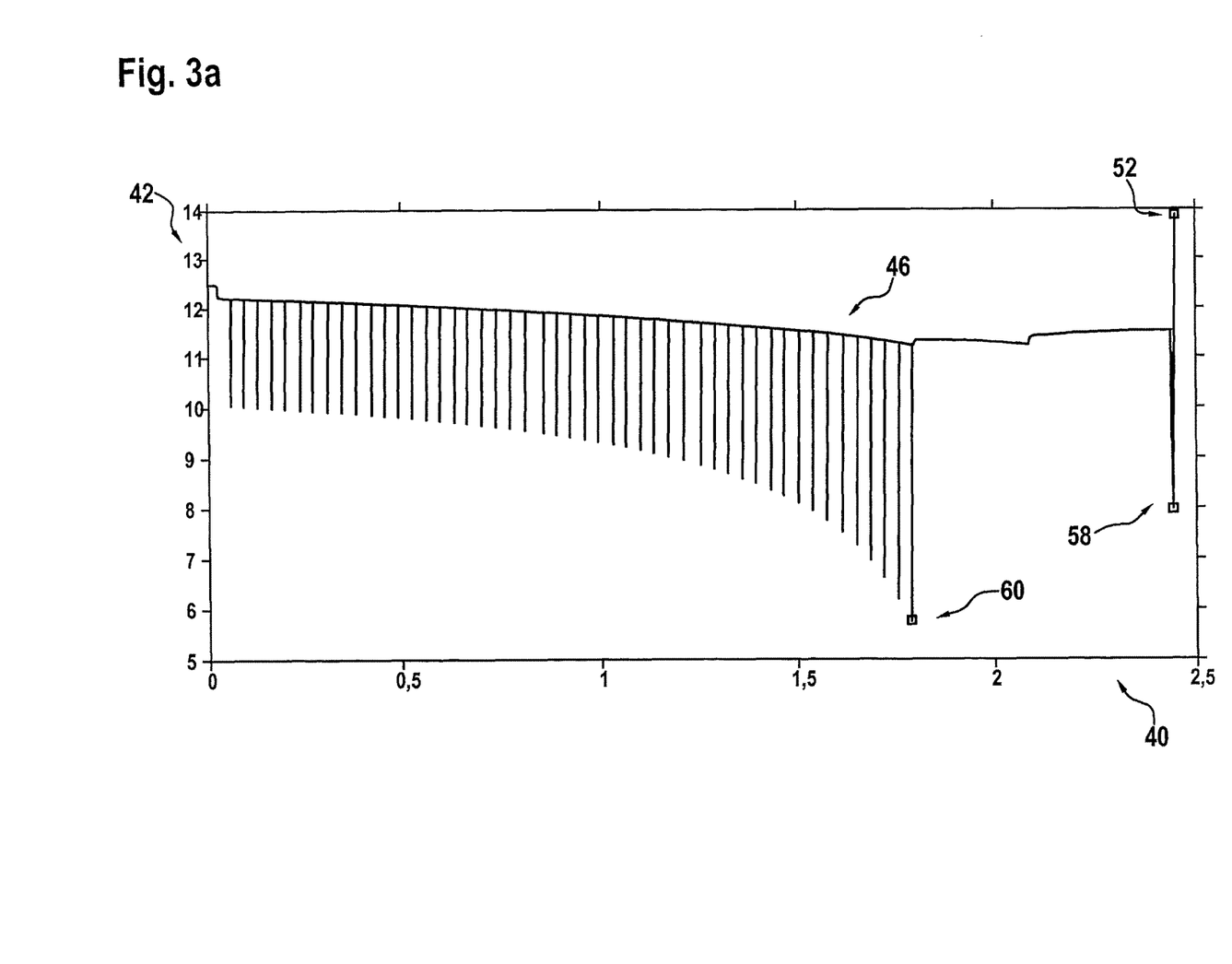
FIG. 3 shows diagrams of an operating parameter which results in a second specific embodiment of the method according to the present invention.
Figure 3B:
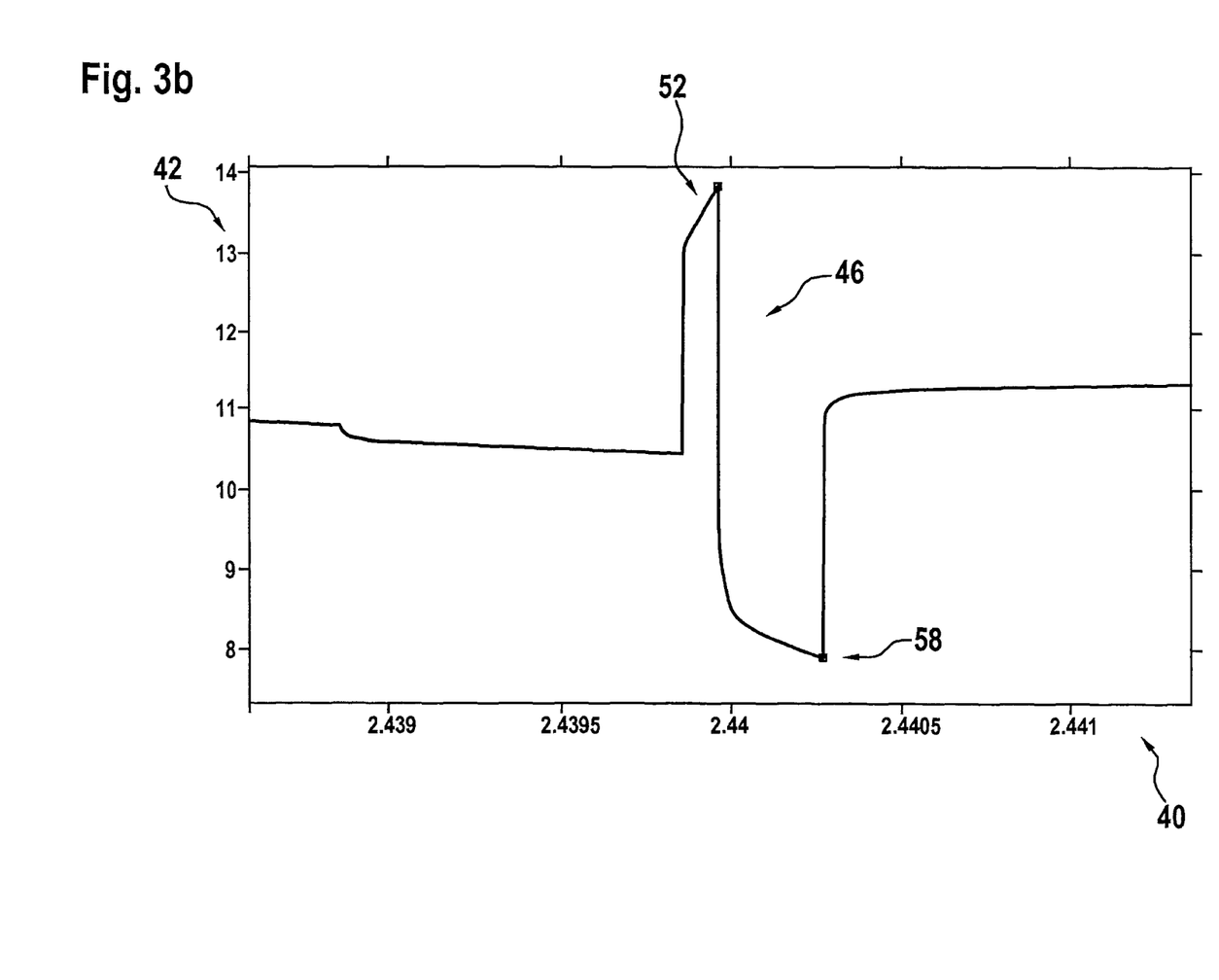

FIG. 3a shows a curve 46 of an actual value of the voltage of first battery 14 when it is discharged by multiple successive starting operations in a time segment up to approximately 1.8 $10^4$ s. Subsequently, battery 14 is supported until the starting operation (diagram in FIG. 3b) is carried out by DC/DC converter 4 at approximately 2.44 $10^4$ s.

In the first specific embodiment (diagrams in FIG. 2) of the method, it is provided that a charging time of first battery 14 is 30 s long, for example. In the second specific embodiment (diagrams in FIG. 3) of the method, the charging time of first battery 14 is only 1 s. The charging time here is shown only as an example and may be adapted to the respective demand of a motor vehicle.

In both specific embodiments of the method according to the present invention, the start-induced voltage dip in first battery 14 and thus in first vehicle electrical system 10 may be reduced. The actual value of the voltage of first battery 14 is ascertained here by control unit 6 after the intent-to-start has been signaled.

Furthermore, in at least some of the starting operations carried out previously, a value for the voltage dip and/or an actual value of first battery 14 may be recorded by control unit 6 and stored. In addition, a last actual value of first battery 14 at a last carried out shutdown of the motor vehicle may also be stored by control unit 6.

Furthermore, it is possible to take into account how much time has elapsed between the last shutdown of the motor vehicle and the instantaneous intent-to-start. Taking into account these aforementioned operating parameters, control unit 6 is able to ascertain whether the start to be carried out by starter 18 is to be supported by conversion of electrical energy from second vehicle electrical system 12 via DC/DC converter 4 into the first vehicle electrical system and how much energy is to be converted here and thus to be transferred. It is also possible that DC/DC converter 4 memorizes at least one operating parameter of first battery 14 via a signal input and thus may also assume the function of control unit 6.

If the starting capability is no longer ensured, which means that the actual value of the voltage as a possible operating parameter drops below a threshold value of 6 V, for example, during starting, this may be checked, for example, by an actual SOC (state of charge) value as an additional operating parameter of first battery 14. In addition, a power control unit situated in control unit 6 and thus integrated there prompts, for a period of time of x s, for example, x=30 s (FIG. 2) or x=1 s (FIG. 3), DC/DC converter 4 to convert a high current of I=220 A, for example, and to transfer it from second vehicle electrical system 12 having a high nominal voltage to first vehicle electrical system 10 having a low nominal voltage, consumers 16 drawing a current of I$\leq$=50 A, for example. The entire remaining current is picked up by first battery 14. The actual starting operation is carried out next.

Due to the brief charging via DC/DC converter 4, the acid content of the plates of first battery 14 increases greatly. The longer current is converted by DC/DC converter 4 and transferred from second vehicle electrical system 12 into first vehicle electrical system 10 and thus first battery 14 is charged, the lower is value 54 (FIG. 2), 58 (FIG. 3) of the voltage dip achievable within the scope of the method. Value 54 is reached for the voltage dip in the present specific embodiment at a charging time of 30 s, whereas value 58 of the value for the voltage dip is reached at a charging time of 1 s.

In the first specific embodiment of the method according to the present invention (FIG. 2), the voltage level in the discharges carried out previously drops from the maximum achieved value 50 to a value 54 of 9.72 V here, but this is higher than a value 56 of 5.92 V. Accordingly, in the second specific embodiment (FIG. 3) of the method, the voltage drops from a maximum achievable value 52 during the starting operation to a value 58 of 7.9 V, although this is higher than a value 60 of 5.92 V. Values 56, 60 are obtained without support by DC/DC converter 4.

A large portion of the current required for carrying out the starting operation is, controlled by the power control unit in control unit 6, supplied via DC/DC converter 4 to first vehicle electrical system 10 from second vehicle electrical system 12, so that first battery 14 carries a much lower load. It is apparent from this that the starting capability is made possible through support from second vehicle electrical system 12, even with a charging time of only 1 s.

If it is impossible to monitor a control of DC/DC converter 4 in a so-called emergency starting operation via bus network 8, since first battery 14 is too weak, for example, and consumers in network 8 cannot be adequately supplied with energy, DC/DC converter 4 may be provided with an additional signal input and may thus be furnished therewith. If a signal is supplied via this additional signal input, DC/DC converter 4 may be switched to an emergency starting operation and electrical energy from second vehicle electrical system 12 may be converted and transferred into first vehicle electrical system 10 for at least a certain time in accordance with a predefined internal setpoint value, which is defined as a parameter.

DC/DC converter 4 may be supplied with energy either from first vehicle electrical system 10 or optionally also from second vehicle electrical system 12, which has a higher nominal voltage. If DC/DC converter 4 is also supplied with electrical energy from second vehicle electrical system 12, the starting operation, for example, an emergency starting operation, may also be carried out in the case of an additionally prolonged idle time of the motor vehicle.

What is claimed is:

1. A method for starting a motor vehicle, which includes a first vehicle electrical system to which a battery of the motor vehicle is assigned, a second vehicle electrical system, to which an electric machine of the motor vehicle is assigned, and a DC/DC converter for connecting the first and second vehicle electrical systems, comprising:
   determining, in response to an intent to start signal and prior to a starting operation of the motor vehicle, whether an actual value of at least one operating parameter of the battery is below a setpoint value; and
   if the actual value of the at least one operating parameter of the battery is below the setpoint value, converting electrical energy from the second vehicle electrical system via the DC/DC converter and transferring the converted energy into the first vehicle electrical system for the starting operation,
   wherein the electrical energy is transferred prior to the starting operation, and the amount of the electrical energy transferred is determined as a function of one or more additional parameters of the first vehicle electrical system including at least one of: a value of a voltage dip of the battery during a previous starting operation, a value of a voltage of the battery during the previous starting operation, or a value of a voltage of the battery upon a most recent shutdown of the motor vehicle.

2. The method as recited in claim 1, wherein the electrical energy from the second vehicle electrical system is converted via the DC/DC converter and transferred into the first vehicle electrical system during the starting operation.

3. The method as recited in claim 1, wherein the at least one operating parameter of the battery is an actual voltage value of the battery, and wherein electrical energy from the second vehicle electrical system is converted via the DC/DC converter and transferred into the first vehicle electrical system if the actual voltage value of the battery drops below the setpoint value prior to the starting operation.

4. The method as recited in claim 3, wherein the second vehicle electrical system has a higher nominal voltage than the first vehicle electrical system.

5. The method as recited in claim 4, wherein the DC/DC converter is supplied with energy from the second vehicle electrical system.

6. A system for starting a motor vehicle, comprising:
   a first vehicle electrical system to which a battery of the motor vehicle is assigned;
   a second vehicle electrical system to which an electric machine of the motor vehicle is assigned; and
   a DC/DC converter for connecting the first and second vehicle electrical systems,
   wherein the DC/DC converter is configured to convert electrical energy from the second vehicle electrical system and transfer the converted energy into the first vehicle electrical system for starting, if an actual value of at least one operating parameter of the battery drops below a setpoint value prior to a starting operation of the motor vehicle, wherein the electrical energy is transferred prior to the starting operation, and the amount of the electrical energy transferred is determined as a function of one or more additional parameters of the first vehicle electrical system including at least one of: a value of a voltage dip of the battery during a previous starting operation, a value of a voltage of the battery during the previous starting operation, or a value of a voltage of the battery upon a most recent shutdown of the motor vehicle.

7. The system as recited in claim 6, wherein the DC/DC converter has a signal input via which a prompt signal is supplied to DC/DC converter, wherein the prompt signal prompts the DC/DC converter to convert electrical energy from the second vehicle electrical system and transfer the converted energy into the first vehicle electrical system.

8. The system as recited in claim 7, further comprising:
   a control unit including a processor configured to (i) check an actual value of the at least one operating parameter of the battery and (ii) monitor a function of the DC/DC converter.

9. The system as recited in claim 8, wherein the control unit is part of the DC/DC converter and has a signal input to receive the at least one operating parameter of the battery.

10. The method as recited in claim 1, wherein the one or more additional parameters includes how much time has elapsed between a most recent shutdown of the motor vehicle and the intent to start signal.

11. The method as recited in claim 1, further comprising selecting a time period for transferring the electrical energy to control the amount of the electrical energy transferred.

12. The method as recited in claim 1, wherein the selecting the time period includes selecting between at least a first time period and a second time period, the first time period being shorter than the second time period.

13. A method for starting a combustion engine of a motor vehicle, which includes a first vehicle electrical system to which a battery of the motor vehicle is assigned, a second vehicle electrical system to which an electric machine of the motor vehicle is assigned, and a DC/DC converter for connecting the two vehicle electrical systems for starting the combustion engine, the method comprising:
   if an actual value of at least one operating parameter of the battery drops below a setpoint value prior to a starting operation that is to be carried out, converting electrical energy from the second vehicle electrical system via the DC/DC converter into the first vehicle electrical system, wherein the converting takes into account how much time has passed between a last shutdown of the motor vehicle and a current start request, and one or more additional parameters including at least one of: a value of a voltage dip of the battery during a previous starting operation, a value of a voltage of the battery during the previous starting operation, or a value of a voltage of the battery upon a most recent shutdown of the motor vehicle.

14. A system for starting a combustion engine of a motor vehicle, comprising:
   a first vehicle electrical system to which a battery of the motor vehicle is assigned;
   a second vehicle electrical system to which an electric machine of the motor vehicle is assigned;
   a DC/DC converter for connecting the two vehicle electrical systems, the DC/DC converter being configured to convert electrical energy from the second vehicle electrical system into the first vehicle electrical system, for starting the combustion engine, if an actual value of at least one operating parameter of the battery drops below a setpoint value prior to a starting operation to be carried out; and a control unit to control the converting of the electrical energy by the DC/DC converter by taking into account how much time has passed between a last shutdown of the motor vehicle and a current start request, and one or more additional parameters including at least one of: a value of a voltage dip of the battery during a previous starting operation, a value of a voltage of the battery during the previous starting operation, or a value of a voltage of the battery upon a most recent shutdown of the motor vehicle.

\* \* \* \* \*